(12) United States Patent
Rattunde

(10) Patent No.: US 7,908,758 B2
(45) Date of Patent: Mar. 22, 2011

(54) PROFILE MEASURING OF TUBE/PIPE ENDS

(76) Inventor: Ulrich Rattunde, Bentwisch (DE)

( * ) Notice: Subject to any disclaimer, the term of this patent is extended or adjusted under 35 U.S.C. 154(b) by 11 days.

(21) Appl. No.: 12/226,695

(22) PCT Filed: Apr. 17, 2007

(86) PCT No.: PCT/DE2007/000672
§ 371 (c)(1),
(2), (4) Date: Oct. 24, 2008

(87) PCT Pub. No.: WO2007/124717
PCT Pub. Date: Nov. 8, 2007

(65) Prior Publication Data
US 2009/0077823 A1    Mar. 26, 2009

(30) Foreign Application Priority Data
Apr. 24, 2006 (DE) .................. 10 2006 019 354

(51) Int. Cl.
*G01B 5/20* (2006.01)
(52) U.S. Cl. ........................................ 33/551
(58) Field of Classification Search .......... 33/529, 33/549, 550, 551, 552, 553, 554
See application file for complete search history.

(56) References Cited

U.S. PATENT DOCUMENTS

| 4,084,324 | A * | 4/1978 | Whitehouse | 33/545 |
| 6,484,571 | B1 * | 11/2002 | Hidaka et al. | 33/551 |
| 6,539,642 | B1 | 4/2003 | Moriysau | |
| 7,197,836 | B2 * | 4/2007 | Kikuti | 33/555 |
| 2005/0235507 | A1 * | 10/2005 | Badami et al. | 33/507 |
| 2006/0037208 | A1 * | 2/2006 | McMurtry | 33/554 |
| 2006/0085995 | A1 * | 4/2006 | Katamachi | 33/550 |
| 2007/0162255 | A1 * | 7/2007 | Chiu | 702/167 |

FOREIGN PATENT DOCUMENTS

| DE | 3641750 | 6/1988 |
| DE | 3816130 | 11/1989 |
| DE | 4034702 | 5/1992 |
| DE | 69211123 | 12/1996 |
| DE | 19544537 | 5/1997 |
| DE | 19918779 | 9/2000 |
| DE | 10258579 | 7/2004 |
| WO | WO03/008900 | 1/2003 |

* cited by examiner

*Primary Examiner* — G. Bradley Bennett
(74) *Attorney, Agent, or Firm* — Varnum, Riddering, Schmidt & Howlett LLP

(57) ABSTRACT

The invention concerns a profile measuring fixture for the measuring of the profile of a surface of a narrow body, especially the profile of the surface of the wall of a tube end with a holding fixture (8) for the body (7) and at least a first measuring arm (4) with at least a moveable measuring arm (4), the probe head (9) scans the surface during the measurement and one of the first relative movements between at least the first probe head (9) and the at least first measuring arm (4). At least one probe head sensor (26) is provided during the measurement of the relative position between at least the first measuring arm (4) and the surface in a one dimensional travel direction (L), which changes travel fixture (2,3) whereby the first relative movement direction (S1) is provided inclined to the travel direction (L).

19 Claims, 4 Drawing Sheets

PROFILE MEASURING OF TUBE/PIPE ENDS

RELATED APPLICATIONS

Figure 1:
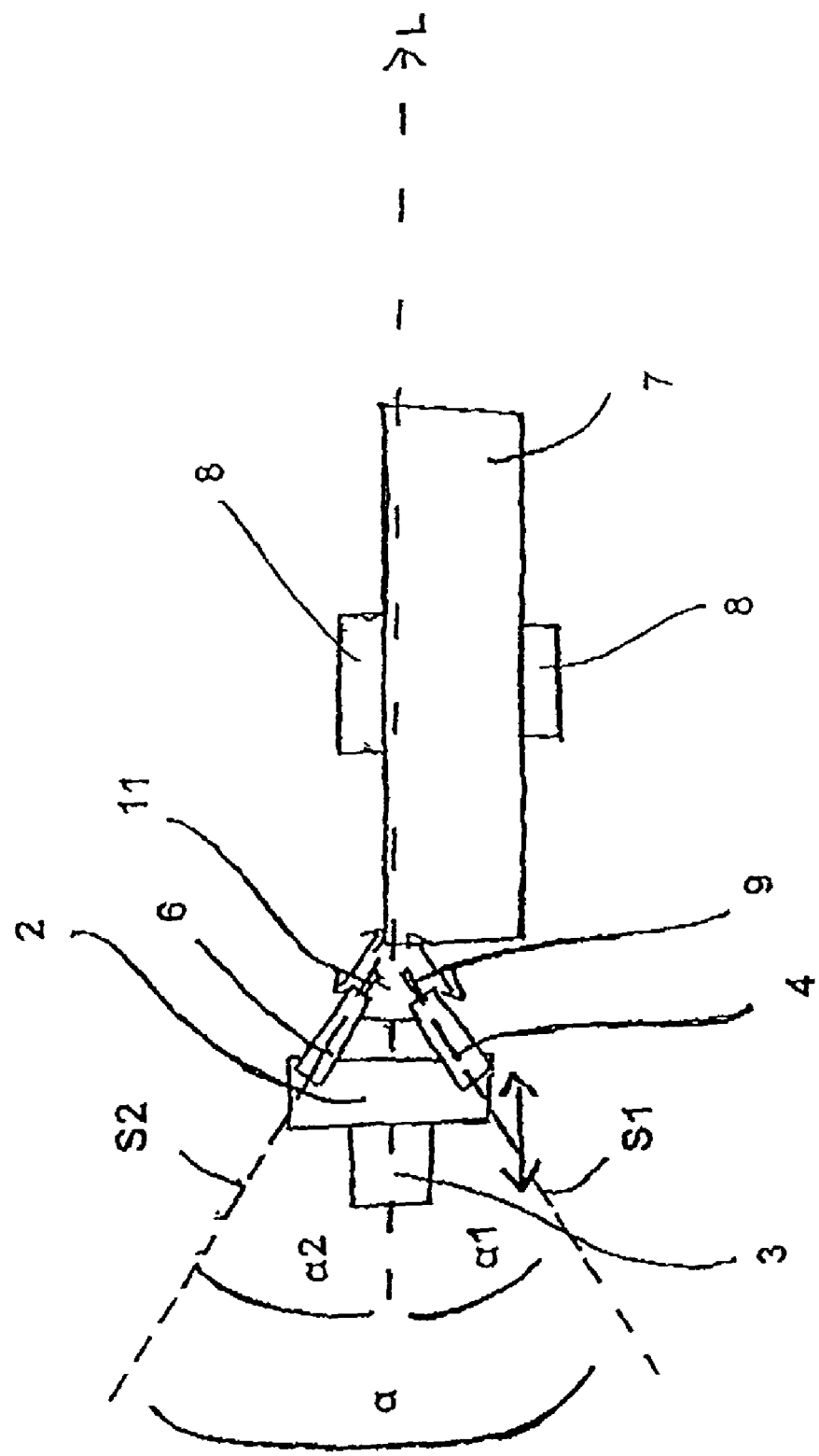

This is a National Phase application based on International Application Serial No. PCT/DE2007/000672 filed Apr. 17, 2007, which claims priority of German patent application 10 2006 019 354.7 filed Apr. 24, 2006.

The invention concerns a profile measuring fixture for the measuring of a profile of the surface area of a body, especially the profile of the surface area of a tube/pipe end, as well as a process for measuring the profile of the surface area of a body with the help of such a profile measuring fixture.

Tube cutting machines cut off sections of tubes. With modern tube cutting machines and integrated finishing treatments of the cut-off tube section takes place by deburring, chamfering, or cleaning of the tube end. Tube processing requirements demand very high precision. For the inspection of the tube section, control measurements take place after the machining/processing. Here the chamfer angle, the wall thickness of the tube section and the axle run-out of the face surface are checked individually for each tube section. For this, state of the art 3-D measuring processes are known. The known 3-D measuring processes take a long time and are not suitable for the short test times required of about one second for each measuring process.

It is the undertaking of the invention to make available a profile measuring fixture, especially for a tube cutting machine and for the process for the measurement of a profile, which enables within a short time the measurement of a profile of a body surface area, especially the measurement of a profile of a wall of a tube end.

The task is solved by the aforementioned profile measuring fixture which shows the characteristics of the main claim.

The profile measuring fixture, according to the patent, utilizes the idea to move at least one measuring arm and the surface relative to one another and move in one dimension. By this, a profile is measured to an incline to the moving direction opposite of at least one measuring arms moving relative to the probe head, which is curved and runs into a two dimensional plane. Thereby, the control of the measuring fixture is especially simple and quick.

The relative position between at least one measuring arm and the surface of the body is one dimensional by the moving fixture, preferably exactly linear; changeable. It is conceivable to move the measuring arm, but it also conceivable to move the body or both relative to each other.

At least one probe head scans the surface constantly during the measurement, preferably makes contact of at least one probe head to the surface constantly. The mechanical probing by touching is especially exact.

For the determination of measuring values on at least one measuring arm, a first probe head sensor is mounted which measures the relative movement of the first probe head in comparison to the first measuring arm, and which leads the measured values at best to a processing unit.

In a preferred design form of the invention, especially for the determination of the profile of the wall of a tube end, a second, preferably identical in construction, type of measuring arm is provided. The second measuring arms shows preferably a steadily touching probe head that touches the surface during the measurement, whereby the relative direction of movement is inclined to the movement direction of the second probe head and inclined to the first relative movement direction. The second measuring arm shows a second probe head sensor which is connected to a processing unit, to which the measuring values are sent. At best the movement direction is chosen in longitudinal direction of the tube section, and the first probe head scans an area of the face surface and the inside walls. The second probe head scans another part of the face surface and the outside walls of the tube ends.

At best, the two measuring arms are arranged mirror-image to the travel direction. The first and the second relative travel direction can be on one plane, which also runs in the same direction of the travel movement. Such an arrangement of preferably three movement directions makes the evaluation of the measuring data especially simple. Furthermore the control of the measuring fixture works quickly.

The first and second measuring arms are preferably securely mounted to each other, preferably as components as a runner??. With it, the relative movement direction is especially stable and measurement errors are decreased.

In a preferred form of the invention, only the movement fixture features a drive. The movement of the first and the second probe head takes places passively by the exerted counter pressure from the surface of the probe head. Each of the two probe heads are preferably connected to a reset spring, which presses the respective probe head against the surface during the measurement. By this, the constant contact of the probe head with the surface is assured, which is required for a high precision measurement.

In an especially preferred form of the profile measuring fixture, according to the invention, the first and possibly the second measuring arm shows respectively a guide for a measuring rod. The guide is at best designed as an especially strong roller bearing. The first measuring rod can show, on one of the surfaces during the measurement, the turned end of the first probe head and on an opposite can show the first measuring inserted end; and all this shows a first measuring plate. The shifting of the first measuring plate can be detected by a first probe head sensor. The first probe head sensor can be designed as an electronic probe or as a laser sensor. In the first case, the shifting can be measured mechanically and in the second case, the first measuring plate serves as a reflection of a signal from the laser sensor. The first probe head sensor is installed in a secure position as an extension of the first measuring rod in the first measuring arm, opposite the first measuring arm. The first probe head sensor measures the distance to the first measuring plate and transmits the measured data to the processing unit, which determines e.g. the length of the relative movement of the probe head. The actual distance measurement takes places preferably protected on the inside of the first measuring arm. The same goes for the second measuring arm.

Preferably exactly two measuring arms are provided, which are arranged at an angle of each 30 degrees to the direction of the movement. Each of the measuring heads is cone shaped and shows at its outer end a rollable sphere. The rollable sphere runs along the surface of the cut during the measurement. This form of the probe head is especially robust.

At best, between the guide and the runner of the moving fixture, a third measuring fixture is provided which shows a third sensor and a third measuring plate. The third measuring plate is positioned securely to the runner and the sensor is positioned securely to the guide. Both together act as a third measuring fixture. The third sensor measures the distance of travel and transmits the measuring values to the processing unit. For cost reasons all three sensors are identical in construction. From the three measuring values of the first and the second probe head sensor, as well as from the measuring values from the third sensor, the processing unit calculates the profile of the surface. Thereby the length of the measured profile conforms mainly to the travel distance. The maximum width of the body is limited to above the maximum distance of the two probe heads.

The body is fastened to a holding device and at least one probe head scans the surface during the measurement. During the measurement at least one probe head relative to at least one measuring arm is moved inclined to a travel direction of the travel fixture, and a first relative movement between at least one probe head and at least one measuring arm is measured with at least one probe head sensor. The travel fixture changes, in a one dimensional movement, a relative position between at least one measuring arm and the surface of the body.

In the best circumstance, in an especially suitable process for the testing of tube ends, a second measuring arm identical to the first measuring arm is provided.

The second probe head scans another area of the surface of the body than the first probe head during the measurement. The second probe head is thereby moved during the measurement inclined relative to the second measuring arm, to a travel direction. With a second probe head sensor, the second relative movement is measured between the second probe head and the second measuring arm. The travel fixture changes in a one dimensional movement the relative position between the second measuring arm and the surface of the body. The first and the second probe head carry out a relative movement to each other.

The travel fixture preferably will be powered by a drive. By the travel movement the first probe head is pressed again the surface. In a relative movement, the first probe head gives way to the counter pressure of the first measuring arm and penetrates somewhat into the first measuring arm. The same is true for the second probe head of the second measuring arm.

Before the start of a measurement, the two, preferably touching, probe heads are moved against the face plate of the tube end to be measured until contact. At the latest the measuring values are received and are transferred to the processing unit. By the infeed of the travel fixture, the two probe heads are pressed against the face plate and penetrate, by the counter pressure into the respective inclined measuring arms. By this inclined position the two probe heads move away from each other. The two probe heads travel across the profile and transmit the measuring data continuously into the processing unit. The processing unit calculates the profile from the measuring data and compares it in a comparator the measured values with the rated values which have been stored.

If the actual values are outside of a specified recorded tolerance, the sorting signal is given to an unloading fixture for the body, e.g. the cut-off tube section. The unloading fixture is preferably a grappler. When the measurement delivers actual values within the tolerance, a sorting signal is given to the grappler which moves the cut-off tube end for further processing.

The profile measuring fixture, according to the patent, in a preferred design form can be provided next to the saw blade of an integrated sawing machine for metal tubes. There the profile measuring fixture checks the adherence to the rated values for wall thickness, chamfer angle, face places etc. within the respective tolerance.

The invention will be described in four figures by way of design examples.

Figure 2B:
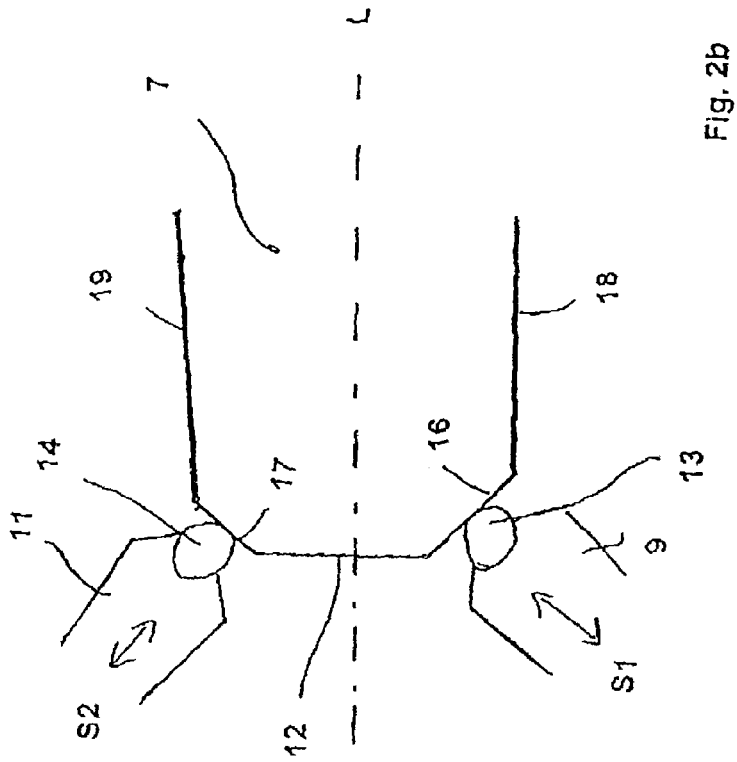
Figure 2A:
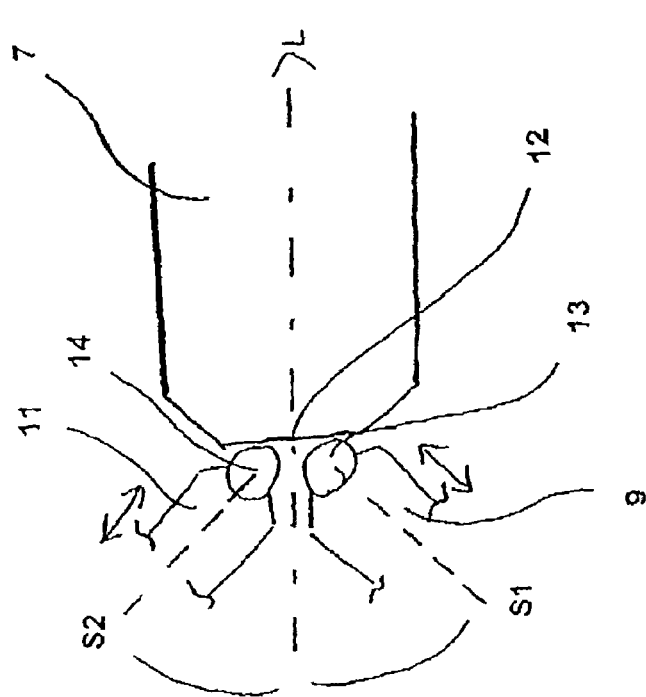
Figure 3:
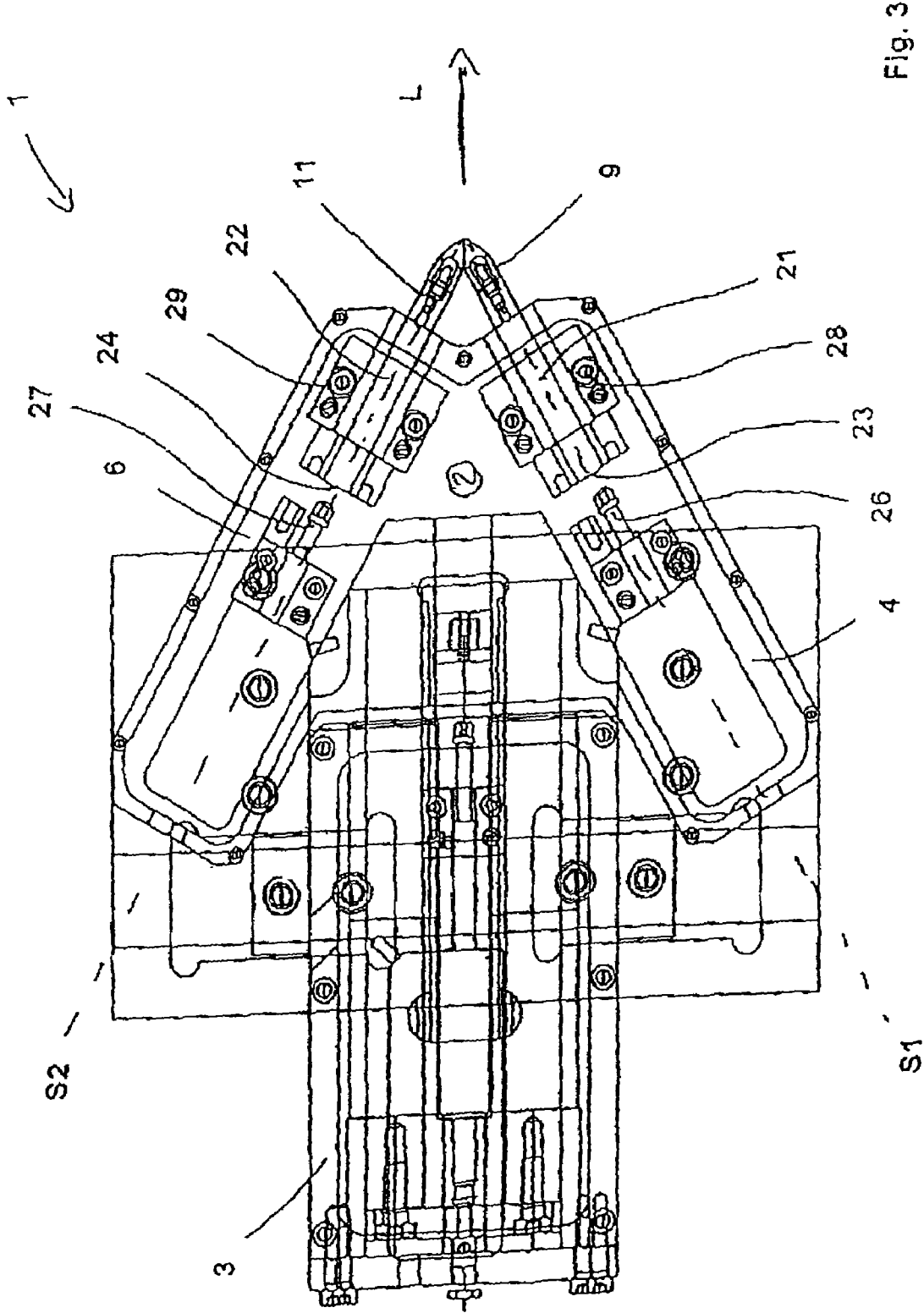
Figure 4:
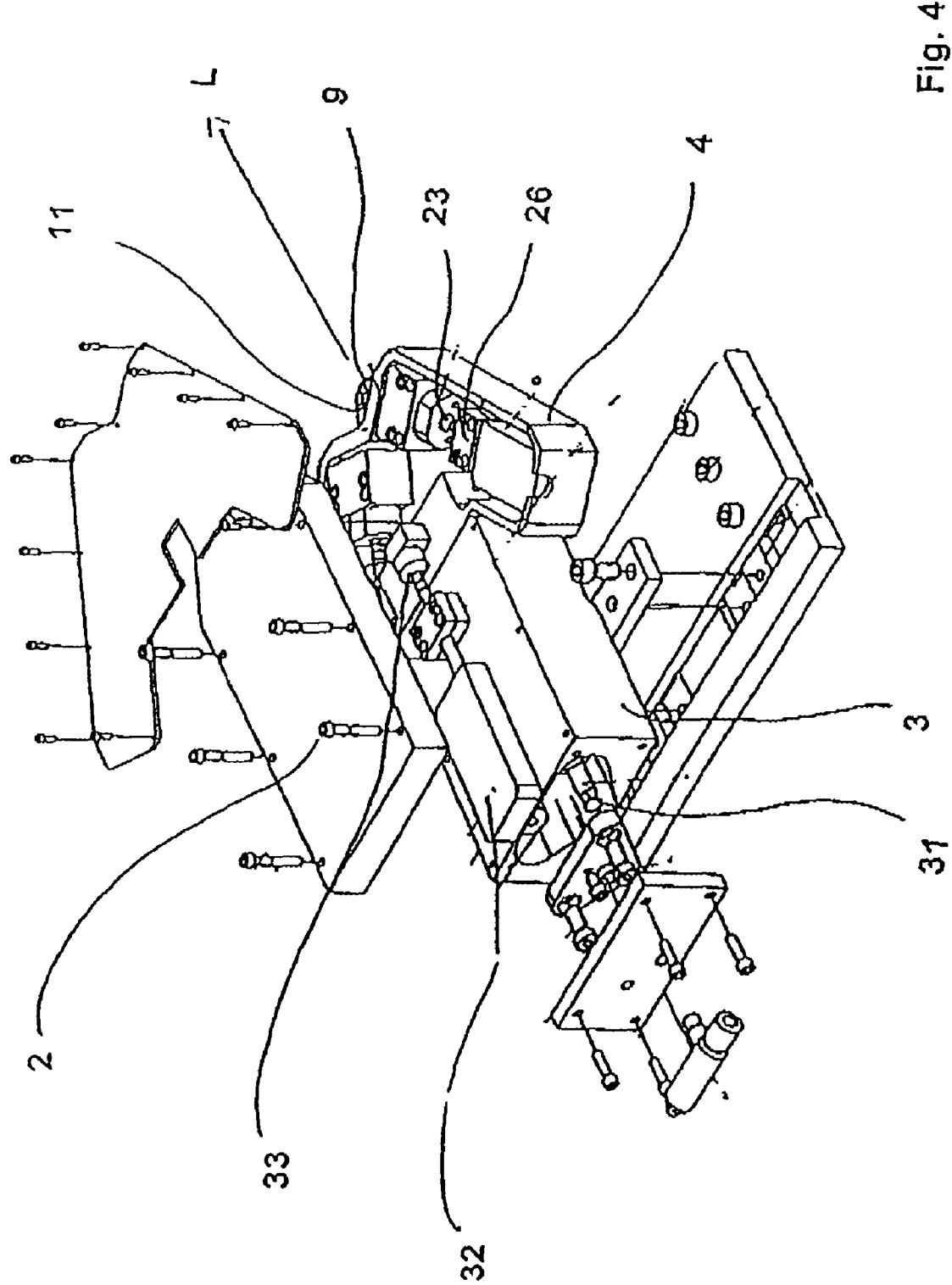

Here the following is shown:

FIG. 1 A schematic top view of a measuring fixture, according to invention, of a clamped cut tube section FIG. 2a A schematic view of the starting position of the probe head arrangement for carrying out the measuring process FIG. 2b A schematic view of a probe head arrangement during the measuring process FIG. 3 A sectional view of the measuring fixture FIG. 4 A explosion view of the measuring fixture in FIG. 3

The depicted measuring fixture in FIG. 1 shows a runner 2, running back and forth, on a guide 3 in a straight line direction L. Securely mounted component of runner 2 is a first measuring arm 4 and a second measuring arm 6. The first measuring arm 4 and the second measuring arm 6 are arranged in an angle $\alpha$ of approximately 60 degrees to each other. The measuring fixture 1 is arranged mirror-image in the longitudinal direction L, and a first symmetrical axis S1 of the first measuring arm 4 is also arranged as a second symmetrical axis S2 of the second measuring arm 6 in an angle $\alpha1$ of approximately 30° and in angle $\alpha2$ of also approximately 30° to the travel direction L. The arrangement in the angles $\alpha$, $\alpha1$, $\alpha2$ stay during the entire measuring process.

With the measuring fixture 1, the profile of a wall of a cut-off tube section 7 can be measured along the section plane by the two measuring arms 4 and 6. During the measurement a tube 7 in longitudinal direction L between two retainer jaws 8 opposite the guide 3 are clamped in tightly. The two measuring arms 4, 6 can be moved back and forth on the runner 2 in longitudinal direction L. The first measuring arm 4 shows on the clamped tube section 7 a first probe head 8 which is moveable back and forth in longitudinal direction of measuring arm 4. The second measuring arm 6 shows at the tube section 7 a second probe head 11 which can be moved back and forth in the longitudinal direction of the second measuring arm 6.

The measuring fixture 1 is provided as a final quality control in an (not shown) integrated sawing machine. In the integrated sawing machine, rod profiles, preferably metal tubes but also full profiles are cut to size. The ends of the tube sections are subject to a treatment by chamfering, deburring and cleaning. Here the rated values of the chamfering angle, the face plate and the wall thickness have to be adhered to with high precision. Typical tolerances are here 0.1 mm or 0.1°. These tolerances should be kept with a probability of 99.99%. The measuring fixture 1 allows a quick checking of the actual values of the tube end of the cut-off tube section 7. The integrated tube cutting machines allow an extremely quick cycling, so that for a complete measuring process by the measuring fixture 1, including loading, clamping of the tube section 7 between the jaws 8, the actual measuring process and the unloading of the measured tube section 7 in about 1.3 seconds are available. In this time the measuring fixture 1 checks also if the actual values are in the specified tolerance of the rated values.

For the loading and unloading a (not shown) lifting arm is provided. Measuring fixture 1, retainer jaw 8 and lifting arm are couple together over a (not shown) control. The control decides in the case of exceeding the required tolerance, a sorting of the cut-off tube sections. In the case of tolerance at adherence, the control decides for the disposing of the cut-off tube section 7. In each case a container for the tube section 7 is available.

The process is shown in two consecutive steps in FIG. 2a and FIG. 2b. It runs as follows: the cut-off tube section 7 is places with a lifting arm on a support between the retainer jaws 8 and is clamped there with the retainer jaw 8. The clamped tube section 7 between the jaws 8 is tightly secured. The face plate 12 of the tube section 7 is located according to FIG. 2a, a few centimeters next to the probing heads 9, 11 of the first and second measuring arms 4, 6. A tip of each probe head 9, 11 feature each a rollable sphere 13, 14. The first rollable sphere 13 is arranged at the tip of the first probe head 9; the second rollable sphere 14 is arranged at the tip of the second probe head 11. The two spheres 13, 14 touch each other before the measurement.

By way of the moveable runner 2 on the guide 3 in the longitudinal direction L, the two measuring arms 4, 6 are moved in longitudinal direction L to the face plate 12 until the two probe heads 9, 11 touch approximately in the center of the face places 12 of the to be measured end of the tube section 7. As described in FIGS. 3 and 4, continuous position measuring values from the two probe heads 9, 11 are taken. The actual measuring process starts as soon as both spheres 13, 14 touch the face place 12. This takes places at the same time. The runner 2 is moved further in the longitudinal direction L in a straight line. The travel movement in longitudinal direction L and the counter pressure exerted by the securely mounted face plate 12 on the two probe heads 13, 14, leads to an avoidance movement of both probe heads 9, 11 along the respective relative movement axes S1 or S2 which conform to the symmetric axes in the respective measuring arms 4, 6.

The angle arrangement α1, α2 of the two relative movement axes S1, S2 to the longitudinal direction L effects the diverging of the first and second sphere 13, 14 during the entering of the probe heads 9, 11 into the respective measuring arms 4, 6. During the entire measurement both sphere 13, 14 stay in contact with the surface of the end of the tube section 7. The first and second sphere 13, 14 roll in opposite direction to each other relative to the tube section 7, along the face plate 12 until the first sphere 13 reaches the inner chamfer 16 of the tube end. The inner chamfer 16 forms with the face plate 12 a first inner chamfer angle around the tube end. The outside sphere 14 rolls to the outside chamfer 17. The outside chamfer 17 forms with the face plate 12 a first outside chamfer angle.

The first and second sphere 13, 14 reach, during the depicted measurements, the first inside or the first outside chamfer angle approximately at the same time. By the feed of the two measuring arms 4, 6 the two spheres 13, 14 run thereafter on the inside chamfer 16 or on the outside chamfer 17 up to the second inside chamfer angle or up to the second outside chamfer angle. By the feed of the first measuring arm 9 in longitudinal direction L, the first sphere 13 reaches, after passing over the inside face chamfer 16, the second inner chamfer angle and then to the inside tube wall 18. The first sphere 13 runs, according to the duration and length of the feed, a certain distance into the longitudinal direction L along the inner tube wall 18. During that time measuring values are continuously registered (about 8000/s per measuring arm 9, 11). By the feed of the second measuring arm 11 in longitudinal direction L, the second sphere 14 reaches, after passing over the outer chamfer 17, the second outer chamfer angle and beyond to the outer tube wall 19. The second sphere runs a respective distance further in longitudinal direction L along the outside tube wall 19.

By its very simple control, the measuring fixture 1 allows a very short measuring time of 0.8 seconds for the measuring process itself. During the total measuring process, the two measuring arms 4, 6 are driven as a linear movement in the longitudinal direction L of the tube section 7. There is no movement of the measuring arms 4, 6 perpendicular to the longitudinal direction L. By the angled arrangement of the measuring arms 4, 6 it is however possible, despite the linear movement to the longitudinal direction L of the measuring arms 4, 6 in a curved tube profile in a two dimensional plane, to be determined.

FIG. 3 shows the detailed construction of the measuring fixture 1. The first measuring arm 4 and the second measuring arm 6 are areas of the runner designed somewhat wing-shaped, in a cross section in the plane of movement. The runner 2 can be moved on a guide 3 in the longitudinal direction L linearly. The end which is turned to the tube section 7 shows a first measuring arm 4 for the first probe head 9. On the side of the tube end, a second measuring arm 6 shows the second probing head 11. The first probe head 9 and the second probe head 11 are arranged to a first measuring rod 21 or a second measuring rod 22 both can be moved in a roller bearing guide 28, 29, but only in relative movement direction S1 and S2. The turned away end of the tube section 7, in the inside of the measuring arms 4, 6 of each measuring rod 21, 22, shows each a measuring plate 23, 24. The measuring plate 23, 24 serve for the reflection of the light signals of one of the first electronic measuring sensor 26 or a second electronic measuring sensor 27 to the first or second measuring plate 23, 24. The first measuring sensor 26 is an elongation of the relative movement axis S1 in comparison to the first measuring arm 4, which is securely fastened to the first measuring arm 4. The first measuring sensor 26 measures the changes of the distance to the first measuring plate 23, and with it the shifting of the first probe head line along the relative movement axis S1. The same is true for the second measuring arm 6.

The indirect measurement of the distance between probe head 9, 10 and the surface of the tube section 7, via moveable measuring rods 21, 22 in roller bearings 28, 29 is insensitive to outside disturbances such as shocks.

FIG. 4 shows the measuring fixture 1 in an explosion view. The guide 3 and the runner 2 are moveable to each other in the longitudinal direction L. In the guide 3 a drive 31 is provided which moves the runner 2 forward. The guide 3 is mounted securely on an integrated sawing machine. On the guide 3 a third electronic measuring sensor 32 is planned, which works together with a third measuring plate 33 connected securely to runner 2. The third electronic measuring sensor 32 allows the measurement of the length of the travel distance of runner 2 in longitudinal direction L opposite of guide 3.

The first electronic measuring sensor 26, the second electronic measuring sensor 27 and the third electronic measuring sensor 32 are connected to the (not shown) processing unit, which calculates the distance measuring values of the profile of a tube wall in the section and the data is continuously sent from the three laser sensors 26, 27, 32. Each sensor can make 8000 measurements per second available. The measuring values are at first synchronized in a measuring triple and from the triple the profile is calculated.

The invention claimed is:

1. Profile measuring device for the measurement of a profile of a surface of a narrow body (7), especially the profiles of the surface of a wall of a tube end comprising:
   a holding device (8) for the body (7);
   a first measuring arm (4) with a first probe head (9) being relatively movable to the at least one measuring arm (4) while scanning the surface during the measurement;
   a second measuring arm (6) with a second probe head (11) being relatively movable to the second measuring arm (6) while scanning the surface during the measurement;
   a first probe head sensor (26) measuring the first relative movement (S1) between the first probe head (9, 11) and the first measuring arm (4, 6);
   a second probe head sensor (27) measuring the second relative movement (S2) of the second probe head (11) and the second measuring arm (6);
   a travel device (2, 3) changing the relative position between the first measuring arm (4) and the surface, and the second measuring arm (6) and the surface in a one dimensional travel direction (L) during the measurement; and whereby the first relative movement direction (S1) is inclined to the travel direction (L) and the second relative movement direction (S2) is inclined to the travel direction (L) and inclined to the first relative movement direction (S1).

2. Profile measuring device according to claim 1 characterized in that the first and/or second measuring arm (4, 6) is fixed at a runner (2) which is movable towards a guide (3).

3. Profile measuring device according to claim 2 characterized in that the runner (2) and the guide (3) can be moved linearly to each other.

4. Profile measuring fixture according to claim 1 characterized in that the first and/or second probe head (9, 11) touches the surface (7) constantly during the measurement.

5. Profile measuring device according to claim 4 characterized in that the first probe head (9) shows a first sphere (13) and the second probe head (11) shows a second sphere (14) which constantly touches the surface (7).

6. Profile measuring device according to claim 5 characterized in that a first press on device between the first probe head (9) and the first measuring arm (4) and a second press on device between the second probe head (11) and the second measuring arm (6), by which the first probe head (9) and the second probe head (11) is pressed against the surface (7) during measurement.

7. Profile measuring device according to claim 1 characterized in that the at least first probe head (9) is securely fastened to at least one first measuring plate (23), and in a clear distance from the at least one first measuring plate (23), a first distance meter (26) is provided securely fastened to the at least one first measuring arm (4) and is directed to the at least one first measuring plate (23).

8. Profile measuring device according to claim 7 characterized in that the second probe head (11) is securely fastened to a second measuring plate (24), and in a clear distance provided from the second measuring plate (24), a second distance meter (27) is provided securely fastened to the second measuring arm (6) and is directed to a second measuring plate (24).

9. Profile measuring device according to claim 7 characterized in that the first and second measuring arm (4, 6) respectively show a guide (28, 29) for respectively a measuring rod (21, 22) to which the end turned toward surface (7), the first respectively second probe head (9, 11) and on the end turned away from surface (7) the first respectively second measuring plate (23, 24) is provided and a distance meter (26, 27) is securely fastened to the first respectively second measuring arm (4, 6) in a clear distance from the first or second measuring plate (23, 24), and is directed to the first or second measuring plate (23, 24).

10. Profile measuring device according to claim 9 characterized in that the first and/or second guide shows each a roller bearing (28, 29).

11. Profile measuring device according to claim 1 characterized by a drive between guide (3) and runner (2) by which the runner (2) can be driven in travel direction (L).

12. Profile measuring device according to claim 11 characterized in that to the guide (3) a third distance meter sensor (32) is securely fastened, which is directed to the measuring plate (33) which is securely fastened on the runner (2).

13. Profile measuring device according to claim 12 characterized by a processing unit which is connected with the first, second and third distance meters (26, 27, 33) and calculates the profile of a cut of the surface of the body (7) from the data measured by the distance meters.

14. Profile measuring device according to claim 1 characterized in that the first relative movement direction (S1) and the second relative movement direction (S2) lie on one plane and the direction of the travel movement (L) is on the same plane.

15. Profile measuring device according to claim 1 characterized in that the first and the second probe head (9, 11) are movable relative to each other between a minimal distance in which both probe heads (9, 11) preferably touch each other and a maximum distance, that is larger than the smallness of the body (7).

16. Process for the measuring of the profile of a surface of a small body (7), especially of the profile of the surface of a tube end with a profile measuring device according to claim 1, in which:

the body (7) is fastened to a holding device (8);
a first probe head (9) scans the surface of the body (7) during measurement;
a second probe head (11) scans the surface of the body (7) during measurement;
the first probe head (9) is moved during the measurement relative to the first measuring arm (4) inclined to a travel direction (L);
the second probe head (11) is moved during the measurement relative to the second measuring arm (6) inclined to the travel direction (L);
the first relative movement (S1) between the first probe head (9) and the first measuring arm (4) is measured with a first probe head sensor (26);
a second relative movement (S2) between the second probe head (11) and the second measuring arm (6) is measured with a second probe head sensor (27); and
a travel device (2, 3) changes in a one dimensional travel movement (L) a relative position between the first measuring arm (4) and a surface of the body (7) and a relative position between the second measuring arm (6) and the surface of the body (7).

17. Process according to claim 16 characterized in that the travel device (2, 3) is driven by a drive (31), thereby the at least one probe head (9, 11) is pressed against the surface and in a relative movement (S1, S2 towards the at least one measuring arm (4, 6) evades the pressure.

18. Process according to claim 16 characterized in that the travel device (2, 3) executes a linear movement (L).

19. Process according to claim 16 characterized in that the first and/or second relative movement (S1, S2) is measured with a first and/or second probe head sensor (26, 27) and the travel movement (L) is measured with a third sensor (33) and the measuring values of the three sensors (26, 27, 33) will be sent to a processing unit and there the profile of the surface will be calculated.

* * * * *